UNITED STATES PATENT OFFICE.

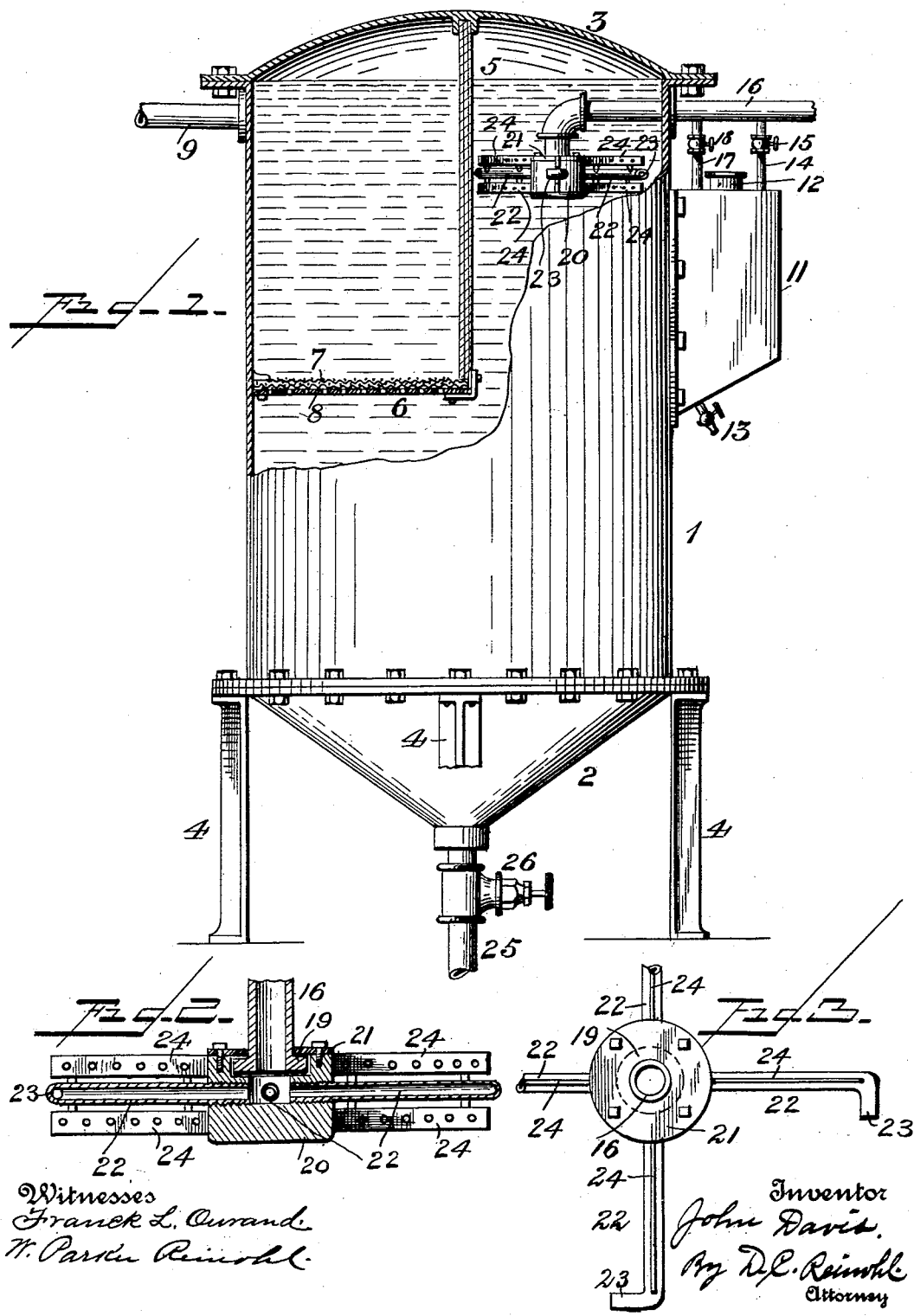

JOHN DAVIS, OF PITTSBURG, PENNSYLVANIA.

APPARATUS FOR PURIFYING WATER.

SPECIFICATION forming part of Letters Patent No. 704,244, dated July 8, 1902.

Application filed January 2, 1902. Serial No. 88,109. (No model.)

*To all whom it may concern:*

Be it known that I, JOHN DAVIS, a citizen of the United States, residing at Pittsburg, in the county of Allegheny and State of Pennsylvania, have invented certain new and useful Improvements in Water-Purifiers; and I do hereby declare the following to be a full, clear, and exact description of the invention, such as will enable others skilled in the art to which it appertains to make and use the same.

My invention relates to the art of purifying water for various purposes in the arts and for household use, and has for its object a thorough commingling of the chemical used for coagulating the impurities with the water supplied to expedite coagulation and increase the efficiency of the precipitator in which the water is treated before it flows to a filter; and it consists in certain improvements in construction which will be fully disclosed in the following specification and claims.

In the accompanying drawings, which form part of this specification, Figure 1 represents a side elevation, partly in section, of my improved precipitator; Fig. 2, a vertical transverse section of the mixer, and Fig. 3 a plan of the mixer detached and on an enlarged scale.

Reference being had to the drawings and the numerals thereon, 1 indicates the body of the precipitator, preferably cylindrical in form, provided with a conical bottom section 2, a detachable cover 3, supporting-legs 4, a baffle-plate 5, which crosses the body 1, an arrester 6, composed of a plurality of layers of wire-gauze 7, resting upon a perforated bottom 8 to intercept any floating bodies of foreign matter carried into the precipitator by the water and prevent them entering a filter, to which water is supplied from the precipitator through pipe 9 at the upper end of the chamber 10, formed by the baffle-plate 5 and the parts 7 and 8.

Secured to the outside of the body 1 is a chamber 11 to be charged with any suitable chemical for coagulating the impurities of the water, such as alum or its equivalent or other reagent, provided with a supply-nozzle 12 and a cock 13 for drawing off sediment, a branch 14, having a valve 15 and connected to the water-supply pipe 16, and a pipe 17, having a valve 18 for supplying the liquefied chemical from chamber 11 to the water in pipe 16 flowing on toward the precipitator.

On the end of the pipe 16 is an annular collar 19 for supporting a submerged mixer, which consists of a body 20, having a cover 21, which engages the collar 19 and secures the mixer thereto loosely to revolve thereon, radial tubular arms 22, having right-angled discharge ends 23 to propel the mixer by the force of the column of water discharged from the ends 23 impacting against the body of water in the precipitator, and above and below the arms 22 and secured thereto are perforated vanes 24, which as they revolve with the arms 22 break up the water into numerous streams and effect a thorough commingling of the chemical contained in the inflowing water from pipe 16 with the water in the upper part of the precipitator and prevent the chemical from gravitating toward the bottom of the precipitator before it has performed its function upon the impurities in the water, and thereby greatly augmenting the work of coagulation.

Having thus fully described my invention, what I claim is—

1. A water-purifier having a supply-pipe, means for supplying a coagulant or reagent to the water in the supply-pipe, and a mechanical mixer submerged in the purifier, revolubly secured to the discharge end of said supply-pipe and revolved by the water flowing through the mixer.

2. A water-purifier having a supply-pipe, means for supplying a coagulant or reagent to the water in the supply-pipe, and a submerged mixer provided with radial arms through which water is discharged and revolubly secured to the end of said supply-pipe.

3. A water-purifier having means for supplying a coagulant or reagent thereto, a water-supply pipe, and a mixer revolubly secured to the end of said supply-pipe and provided with radial arms through which the water is discharged, and vanes secured to said arms.

4. A water-purifier having means for supplying a coagulant or reagent thereto, a water-supply pipe, and a submerged mixer revolubly secured to the end of said supply-pipe and provided with radial arms through which the water is discharged, and perforated vanes secured to said arms.

5. A water-purifier having means for supplying a coagulant or reagent thereto, a water-supply pipe, and a mixer revolubly secured to the supply-pipe and through which the water is discharged into the purifier, in combination with a baffle-plate opposite the mixer and an arrester forming the bottom of a chamber from which clear water is discharged.

In testimony whereof I affix my signature in presence of two witnesses.

JOHN DAVIS.

Witnesses:
ALEXANDER WISHART,
WM. W. WISHART.